United States Patent
Dolph et al.

(10) Patent No.: US 9,935,986 B2
(45) Date of Patent: Apr. 3, 2018

(54) SPATIAL SECURITY IN A SESSION INITIATION PROTOCOL (SIP) CONFERENCE

(71) Applicant: International Business Machines Corporation, Armonk, NY (US)

(72) Inventors: Blaine H. Dolph, Western Springs, IL (US); Sandeep R. Patil, Pune (IN); Riyazahamad M. Shiraguppi, Pune (IN); Gandhi Sivakumar, Victoria (AU); Matthew B. Trevathan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 13/963,091

(22) Filed: Aug. 9, 2013

(65) Prior Publication Data
US 2015/0046597 A1 Feb. 12, 2015

(51) Int. Cl.
G06F 21/00 (2013.01)
H04L 29/06 (2006.01)
H04L 29/08 (2006.01)
H04L 12/18 (2006.01)

(52) U.S. Cl.
CPC ...... *H04L 65/1069* (2013.01); *H04L 12/1818* (2013.01); *H04L 65/1006* (2013.01); *H04L 65/1093* (2013.01); *H04L 65/4038* (2013.01); *H04L 67/18* (2013.01)

(58) Field of Classification Search
CPC ............ G06F 2221/2111; H04L 63/0428
USPC ............................................. 380/258
See application file for complete search history.

(56) References Cited

U.S. PATENT DOCUMENTS

| | | | |
|---|---|---|---|
| 4,920,565 A | 4/1990 | Strawczynski et al. | |
| 6,813,714 B1 | 11/2004 | Hardjono et al. | |
| 7,209,947 B1 | 4/2007 | Lee et al. | |
| 7,224,966 B2 | 5/2007 | Caspi et al. | |
| 8,190,135 B2 | 5/2012 | Gupta et al. | |
| 8,208,616 B2 | 6/2012 | Sastry | |
| 8,644,301 B2 * | 2/2014 | Tamhankar et al. | 370/352 |
| 2004/0170265 A1 | 9/2004 | Benco et al. | |
| 2005/0018827 A1 | 1/2005 | Himmel et al. | |
| 2006/0210044 A1 | 9/2006 | Widger | |
| 2010/0233991 A1 * | 9/2010 | Crawford | H04L 45/00 455/404.1 |
| 2011/0271205 A1 | 11/2011 | Jones et al. | |
| 2014/0277598 A1 * | 9/2014 | Bischoff et al. | 700/20 |

FOREIGN PATENT DOCUMENTS

| | | |
|---|---|---|
| WO | 2011137290 A2 | 11/2011 |
| WO | 2011137290 A3 | 11/2011 |

* cited by examiner

*Primary Examiner* — Anthony Brown
(74) *Attorney, Agent, or Firm* — Edward J. Wixted, III (57) ABSTRACT

In a method for securing a session initiation protocol (SIP) conference session, first location information of a SIP conference session invitee attempting to connect to a SIP conference session is received. The computer determines that the received first location information at least partially matches a location requirement assigned to the invitee attempting to connect to the SIP conference session. The computer causes the invitee to be connected to the SIP conference session.

20 Claims, 3 Drawing Sheets

SPATIAL SECURITY IN A SESSION INITIATION PROTOCOL (SIP) CONFERENCE

FIELD OF THE INVENTION

The present invention relates generally to the field of session initiated protocol (SIP), and more particularly to implementing spatial security in a conference.

BACKGROUND OF THE INVENTION

Session initiation protocol (SIP) is a signaling protocol used for establishing sessions in an internet protocol (IP) network. SIP is an Internet Engineering Task Force (IETF)-defined signaling protocol and is widely used for controlling communication sessions such as voice and video calls over IP. A SIP conference session is an association of SIP user agent devices (i.e., conference participant devices) with a central device (i.e., a conference focus device). The conference focus device is the center of the conference. All participant devices in the SIP conference session are connected to the conference focus device by a SIP dialog. The conference focus device has direct peer-wise relationships with the participant devices by maintaining a separate SIP dialog with each participant device. The conference focus device can be implemented either by a participant device or by a separate application server. A session could be as simple as a two-way telephone call, or it could be a complex and collaborative multi-media conference session. Sessions may consist of one or several media streams. The ability to establish these sessions enables a variety of innovative services such as voice-enriched ecommerce, video calls, webpage click-to-dial, and instant messaging (IM) with buddy lists.

A conference session usually includes a host, who organizes or leads the session, and a number of other invitees, also called guests. The host may often have additional privileges beyond those of the guests, such as, for example, being able to add or remove guests from the session. The host may be distinguished from the guests by login information, or by a participant code that is different from any of the participant codes assigned to the guests.

The Global Positioning System (GPS) is a satellite-based navigation system made up of a network of satellites placed in orbit. GPS satellites circle the Earth and continually transmit messages to Earth that include the time the message was transmitted and the satellite position at the time of the message transmission. A GPS receiver uses the messages it receives from multiple satellites to determine the transit time of each message to calculate the location of the GPS receiver.

SUMMARY

Aspects of an embodiment of the present invention disclose a method, computer program product, and computing system for securing a session initiation protocol (SIP) conference session. First location information of a SIP conference session invitee attempting to connect to a SIP conference session is received. The computer determines that the received first location information at least partially matches a location requirement assigned to the invitee attempting to connect to the SIP conference session. The computer causes the invitee to be connected to the SIP conference session.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

Figure 1:
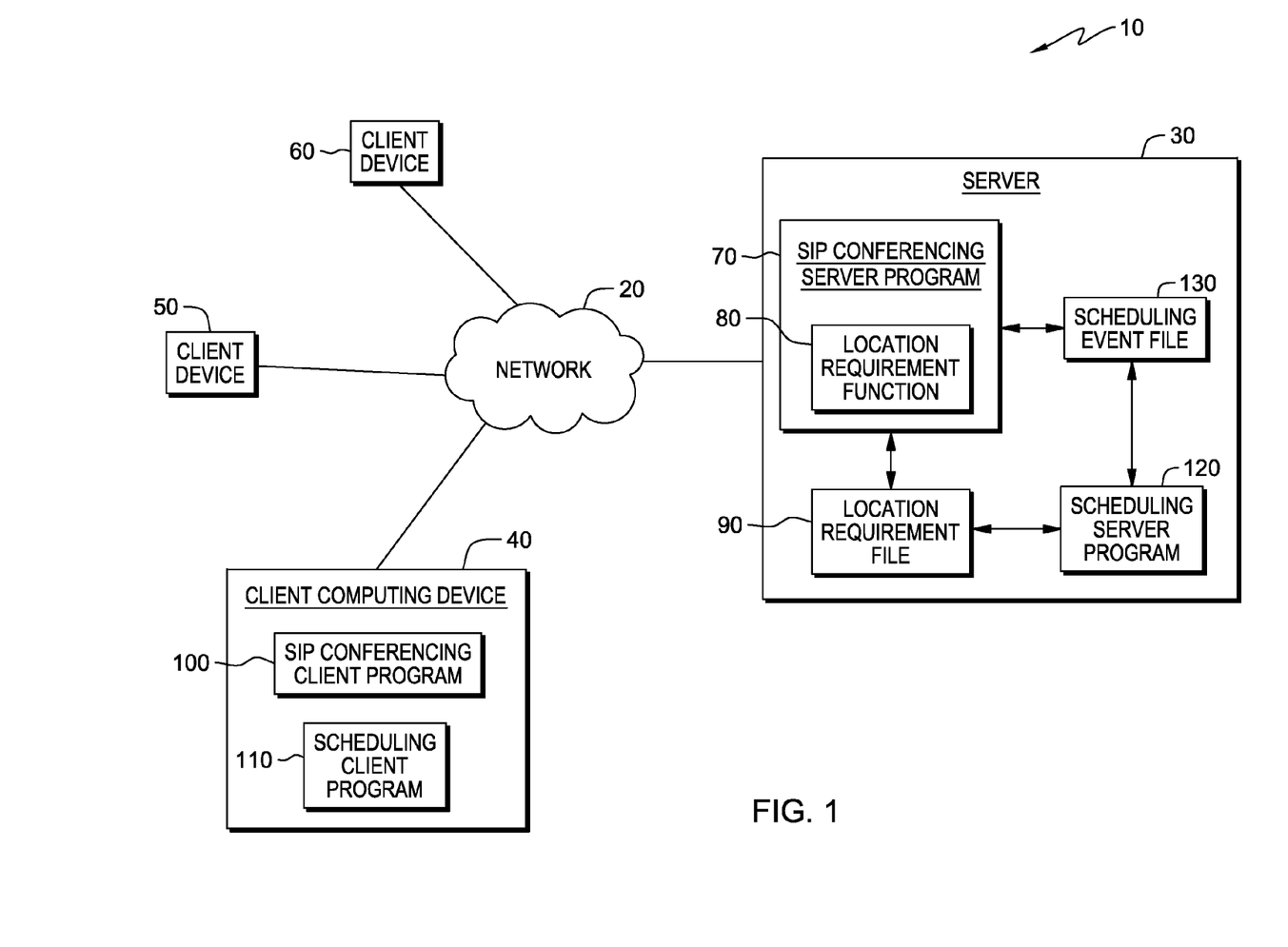
FIG. 1 is a diagram of a computing system in accordance with one embodiment of the present invention.

FIG. 1 depicts a diagram of computing system 10 in accordance with one embodiment of the present invention. FIG. 1 provides only an illustration of one embodiment and does not imply any limitations with regard to the environments in which different embodiments may be implemented.

In the depicted embodiment, computing system 10 includes server 30, client computing device 40, client device 50 and client device 60 interconnected over network 20. Network 20 may be a local area network (LAN), a wide area network (WAN) such as the Internet, the public switched telephone network (PSTN), any combination thereof, or any combination of connections and protocols that will support communications between server 30, client computing device 40, client device 50 and client device 60 in accordance with embodiments of the invention. Network 20 may include wired, wireless, or fiber optic connections. Computing system 10 may include additional servers, client computing devices, or other devices not shown.

Server 30 may be a management server, a web server, or any other electronic device or computing system capable of receiving and sending data, and communicating with client computing device 40, client device 50 and client device 60 via network 20. In some embodiments, functions of server 30 may be performed by a client device, such as client computing device 40. In other embodiments, server 30 may represent a server computing system utilizing multiple computers as a server system, such as in a cloud computing environment. Server 30 contains SIP conferencing server program 70, location requirement function 80, location requirement file 90, scheduling server program 120, and scheduling event file 130.

Client computing device 40 may be a desktop computer, laptop computer, tablet computer, personal digital assistant (PDA), or smart phone. In general, client computing device 40 may be any electronic device or computing system capable of sending and receiving data, and communicating with server 30 over network 20. Client computing device 40 includes scheduling client program 110 and SIP conferencing client program 100.

Scheduling client program 110 executes on client computing device 40. Scheduling client program 110 may be a dedicated client invitation program, a function integrated within another program, such as a client calendaring program, or any other program or function that can communicate with scheduling server program 120 and provide a user interface for creating, receiving and responding to SIP conference session invitations. In other embodiments, scheduling client program 110 may reside on other devices, such as server 30, client device 50, or client device 60, provided that scheduling client program 110 can communicate with scheduling server program 120.

A SIP conference session invitation may be created by, e.g., scheduling client program 110, by selecting invitees and a date and time for a conference session. A location requirement may be applied to one or more of the selected invitees. The location requirement may take the form of a network connection location, an IP address, Global Positioning System (GPS) coordinates, radio-frequency identification (RFID) tag information, a telephone number, other location identifying information, or any combination thereof. Each location requirement may be mapped to a location such as an office, floor, building, or city. Mapping location requirements to these types of locations allows for more recognizable instruction and easier compliance by an invitee. Location requirements may be set for each invitee, or location requirements may be applied to groups of invitees. Invitees may have a list of allowed, or preferred, location requirements that correspond to that invitee, and that list may be stored to a file, such as location requirement file 90. Invitations may be sent to invitees by an electronic message, such as an email message, text message, alert to a scheduling client program, or other communication method. Invitees may accept the one or more location requirements, or they may counter with a different location requirement, or set of location requirements.

SIP conferencing client program 100 executes on client computing device 40. SIP conferencing client program 100 may be a dedicated client SIP conference session program, a function integrated within another program, or a program or function that can communicate with SIP conferencing server program 70 and provide a user interface for sending and receiving SIP conference session communications. In other embodiments, SIP conferencing client program 100 may reside on other devices, such as server 30, client device 50, or client device 60, provided that SIP conferencing client program 100 can communicate with SIP conferencing server program 70. A SIP conference session may use one or more forms of media and communication methods. Typical SIP conference sessions include teleconferences, instant messages, video calls, and collaborative multi-media conference sessions.

In various embodiments of the present invention, client devices 50 and 60 may each respectively be a laptop computer, tablet computer, netbook computer, personal computer (PC), a desktop computer, a personal digital assistant (PDA), a smart phone, a plain old telephone service (POTS) telephone, a voice over internet protocol (VoIP) telephone or a cellular telephone. In general, client devices 50 and 60 may each be any device or computing system capable of transmitting communication data (e.g., audio, video) and location data to server 30 over network 20. Location data may be received from client devices 50 and 60, an external device, or alternatively, some aspect of the connection to network 20 may provide location information. Programs similar to SIP conferencing client program 100 and/or scheduling client program 110 may execute on client devices 50 and 60, if the respective client device 50 or client device 60 is a smart phone, computer, or any other device capable of executing code, sending and receiving data, and communicating with server 30 over network 20.

Scheduling server program 120 operates to receive, forward, and manage conference session invitations between client computing device 40, client device 50, client device 60, and other client devices (not shown). In one embodiment, scheduling server program 120 stores all conference session invitations that it manages to scheduling event file 130. Along with the stored conference session invitations, scheduling server program 120 may also store, to scheduling event file 130, information on whether invitees to the conference session have accepted or rejected the conference session invitation. Scheduling server program 120 may also store, to location requirement file 90, location requirement information for invitees to the conference session, as designated in the conference session invitation. In other embodiments, information stored to scheduling event file 130 and location requirement file 90 may be combined and stored to a single location. In one embodiment, scheduling server program 120 resides on server 30. In other embodiments, scheduling server program 120 may reside on another server or another computing device, provided that scheduling server program 120 is accessible to scheduling client program 110 and has access to schedule event file 130 and location requirement file 90.

Scheduling event file 130 and location requirement file 90 may each be a repository that may be written and read by scheduling server program 120 and may be accessible to SIP conferencing server program 70. For example, scheduling event file 130 and location requirement file 90 may each be a database.

SIP conferencing server program 70 operates to receive communication and participant location data and manage conference session meetings between invitees who participate in a conference session. At the scheduled date and time for the meeting, invitees will connect to the conference session. If the SIP conference session is a teleconference, invitees may call a teleconference number that may be listed in the invitation. In one embodiment, client devices 50 and 60 may be telephones operating over the PSTN. In such an embodiment, invitees may use client devices 50 and 60 to dial a teleconference number to call the teleconference service and are connected to SIP conferencing server program 70 through the use of an internet protocol private branch exchange (IP-PBX), mediation server, or SIP gateway trunk. If the SIP conference session is an instant message session, chat session, or other multimedia session, invitees may connect to SIP conferencing server program 70 through a webpage, uniform resource locator (URL), or application. In one embodiment, SIP conferencing server program 70 resides on server 30. In another embodiment, SIP conferencing server program 70 may reside on another server or another computing device, provided that SIP conferencing server program 70 is accessible to client computing device 40, client device 50, client device 60, and other client devices (not shown), and provided that SIP conferencing server program has access to location requirement file 90 and scheduling event file 130. In one embodiment, SIP conferencing server program 70 includes location requirement function 80.

Location requirement function 80 operates to request that SIP conferencing server program 70 add an invitee attempting to join a conference session if the invitee is connecting from an allowed location. Allowed locations are locations that comply with location requirements, such as location requirements assigned to an invitee by the SIP conference session invitation. Location requirement function 80 also acts to track all invitees connected to the SIP conference session by periodically or dynamically receiving current location information from the invitee. Location requirement function 80 may request that SIP conferencing server program 70 remove an invitee from a conference session if, while tracking the invitee's location, location requirement function 80 determines that the invitee's location has changed to a location that has not been approved for the conference session. In another embodiment, location requirement function 80 may request that SIP conferencing server program 70 send an alert to the invitee and/or host of a session when the invitee's location has changed to a location that is near (e.g., within a specified distance from, etc.) the boundary surrounding an allowed location. If the invitee continues to move to a location outside of the boundary surrounding the allowed location, SIP conferencing server program 70 may disconnect the invitee from the conference session. In yet another embodiment, location requirement function 80 may be optionally overridden by a user command from the host and disabled to allow an invitee to stay connected to the session despite not meeting location requirements.

In one embodiment, location requirement function 80 compares location information received from an invitee, attempting to join a conference session, to stored location requirements for the conference session. Location requirement function 80 then requests that SIP conferencing server program 70 add the invitee to the conference session if location requirement function 80 determines that the location information of the invitee matches stored location requirements for the conference session. In one embodiment, location requirement function 80 is a function of SIP conferencing server program 70 on server 30. In another embodiment, location requirement function 80 may be a separate program that resides on another server or another computing device, provided that location requirement function 80 can communicate with SIP conferencing client program 100 and SIP conferencing server program 70, and provided that location requirement function 80 can access location requirement file 90 and scheduling event file 130.

In one embodiment, the location requirement for a conference session may be certain GPS coordinates where the device from which the attempt to connect is made should be located. In another embodiment, when the session is a teleconference, the location requirement for the conference session may be the telephone number from which a telephone call should originate. In other embodiments, the location requirement(s) for the conference session may be a device's IP address, a connection to a specific network, or any other type of data that can be transmitted from a device to server 30 and that identifies the location where the invitee attempting to access the conference session should be located.

In another embodiment, location boundaries may be defined by the extent of wireless communication networks. For example, an RFID system may be implemented within an office building that can communicate with server 30 based on active or passive RFID tags located on user badges, client devices, or other objects. An invitee may have an employee badge, or some other object that contains an RFID tag. Multiple RFID tag readers may be positioned throughout an office building so that the location of the invitee can be determined. RFID tag readers may create boundaries within the entire office building, individual floors, or individual rooms throughout the office building that designate locations from which the invitee attempting to access the SIP conference session should be located.

Location information may come from a client device, a characteristic of the network a client device is connected to, or an external device. An external device may provide location information and communicate with location requirement function 80 either directly through network 20, or by relaying location information to network 20 through a client device. Location requirements assigned to invitees of the conference session are stored in location requirement file 90.

In one embodiment, location requirement function 80 will track each invitee connected to the SIP conference session by periodically requesting location information from the client device that provided the location information required to access the SIP conference session. If the client device moves, and location information of the client device does not match location requirements assigned to the invitee, then location requirement function 80 may alarm and disconnect the invitee from the SIP conference session.

In one embodiment SIP conferencing server program 70 may use received location information to create a map. Using real-time or frequently updated location information, SIP conferencing server program 70 may generate and display a map that shows the invitees, their connection status, the location (or last known location) of their connection, and other information. Alternate embodiments may display this information as a list, table, or form other than a map.

Location requirement file 90 contains assigned location requirements for possible conference session invitees. Location requirements may be assigned to all conference session invitees as a whole, a group of conference session invitees, or they may be individually assigned to conference session invitees. Location requirements may be assigned on a session by session basis, or they may generally apply to multiple sessions. In one embodiment, location requirements may be linked to a unique participant code or login profile assigned to the invitee. In another embodiment, a host may assign location requirements for one or all of the invitees to the conference session. Location requirement file 90 may contain a database of potential invitees and preferred locations. By providing such a database, a host creating an invitation may be able to select a preferred location for each prospective invitee, or alternatively, automatically assign locations based on stored locations. In one embodiment, location requirement file 90 is located on server 30. In another embodiment, location requirement file 90 may be located on another server or another computing device, provided that location requirement file 90 is accessible to location requirement function 80 and scheduling server program 120.

Figure 3:
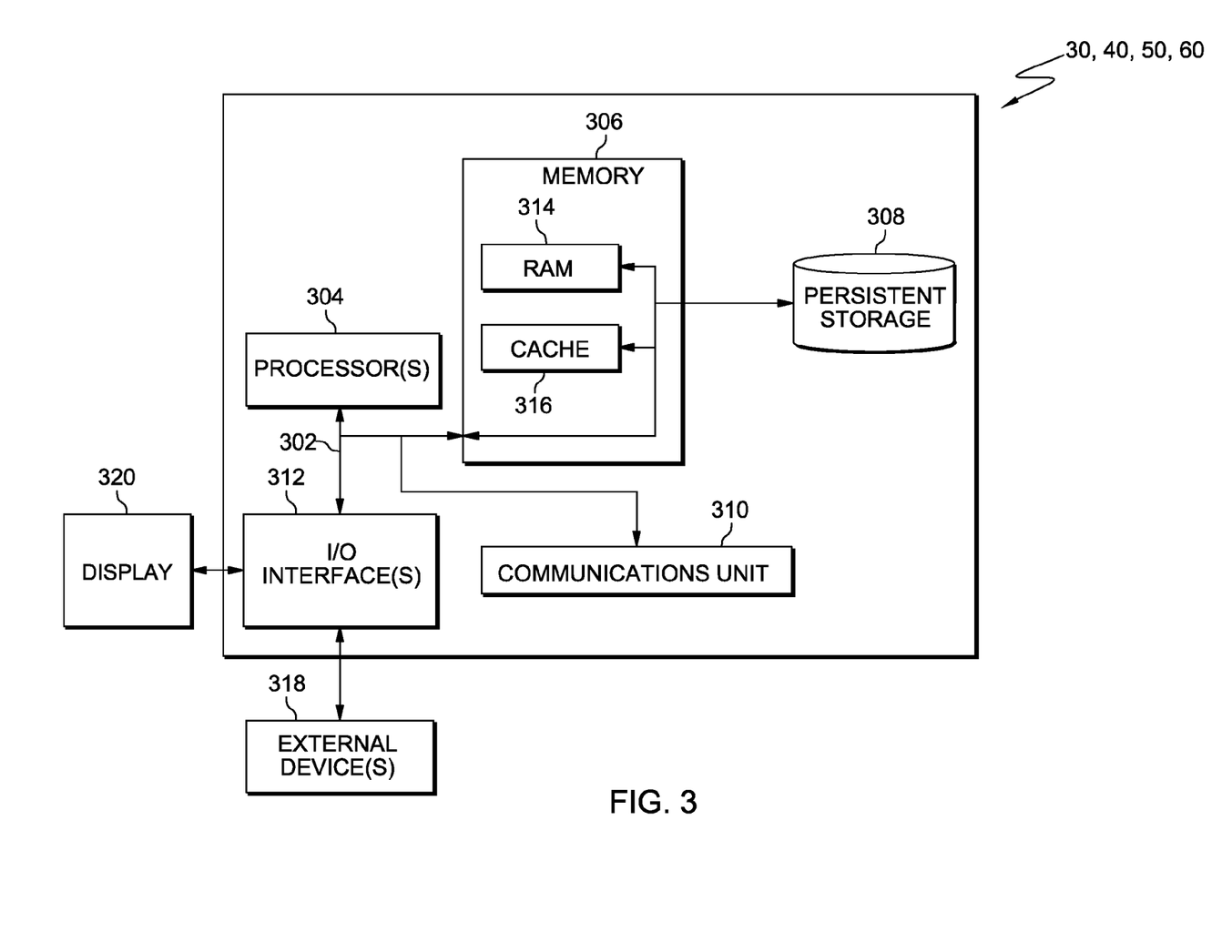
FIG. 3 is a block diagram of internal and external components of the client computing device, the server, and other client devices of FIG. 1 in accordance with one embodiment of the present invention.

Server 30, client computing device 40, and client devices 50 and 60, may each include internal and external hardware components, as depicted and described in further detail with respect to FIG. 3.

Figure 2:
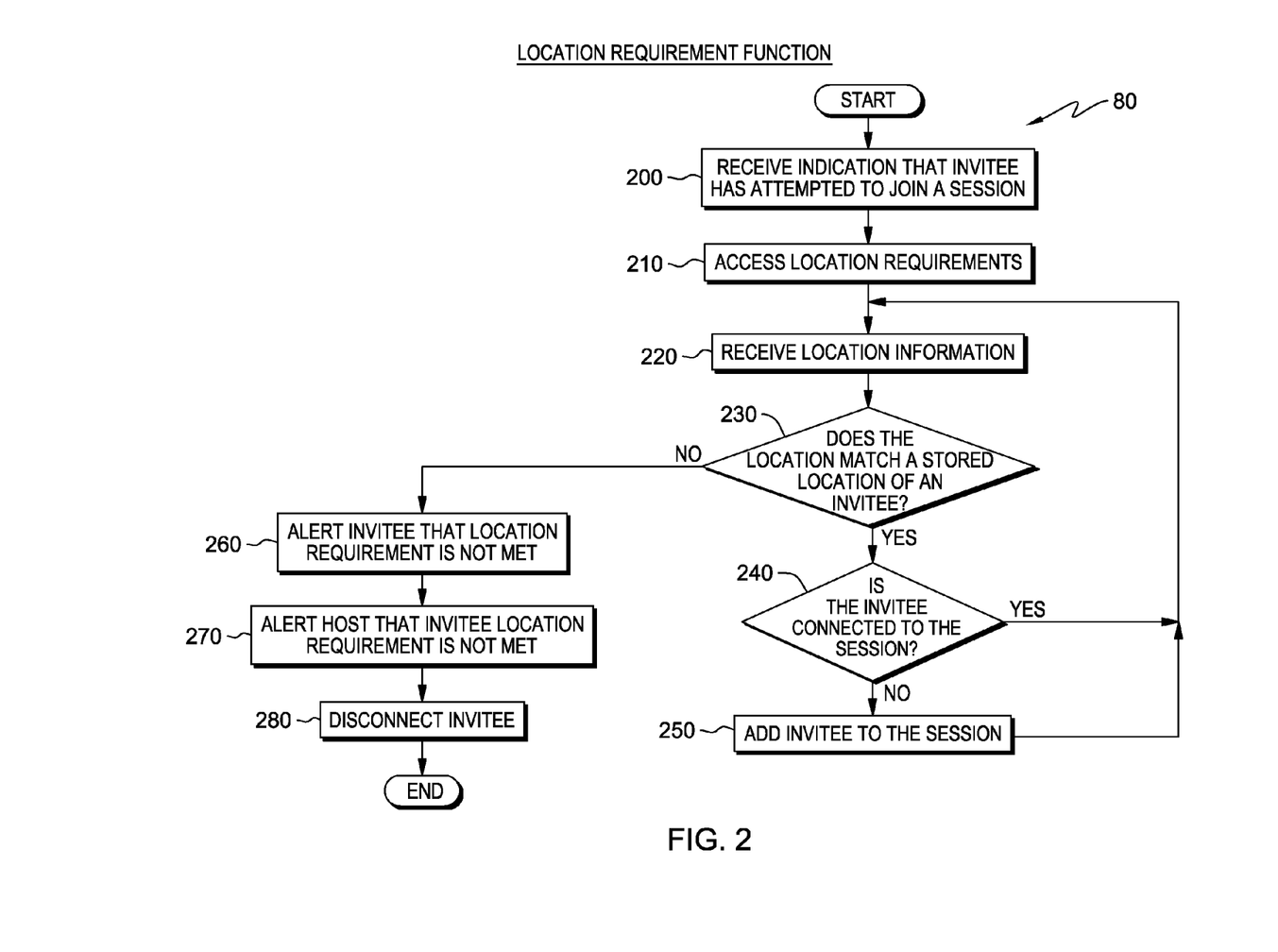
FIG. 2 depicts a flowchart of the steps of a location requirement function in a SIP conference program executing within the computing system of FIG. 1, for adding an invitee to a SIP conference session, in accordance with one embodiment of the present invention.

FIG. 2 depicts a flowchart of the steps of location requirement function 80 executing within the computing system of FIG. 1, for adding an invitee to a SIP conference session, in accordance with one embodiment of the present invention.

In one embodiment, initially, a user of client computing device 40, or another capable device, composes an invitation to a SIP conference session, including entry of at least one invitee to the session other than the user along with location requirements for the invitee(s), using scheduling client program 110. Location requirements for the invitee(s) may be preferred locations previously stored and retrieved from location requirement file 90. In one embodiment, a host may compile a list of possible location requirements. Location requirement function 80 may compare the list of possible location requirements to a list of previously stored preferred locations for each invitee. If one or more of the location requirements between the two lists match, the invitee will be assigned the matching location requirements as location requirements for the SIP conference session. If there is no matching between the two lists, the entire list of possible location requirements, as created by the host, may be assigned to the invitee. Location requirements for the invitee(s) may be assigned to invitees on an individual basis, or they may be assigned to groups of invitees. Scheduling client program 110 sends the invitation, along with the location requirement, to scheduling server program 120. Scheduling server program 120 sends the invitation to the invitee in the form of an electronic message, such as an email message, text message or an alert to a client calendaring program. The invitation may include the date, time, duration, login information, and other information about the session. The invitation may also include location requirements for the invitee in the form of GPS coordinates, IP addresses, or other location identifying means. Potential invitees may have the option to accept the invitation. Alternatively, a potential invitee may counter the invitation and request that they be allowed to access the SIP conference from a different location. If the host accepts the request, then the location requirements for the potentially invitee can be altered. Exemplary embodiments of the present invention will allow for location information to be mapped to specific rooms, floors, buildings, or other locations. Scheduling server program 120 writes the invitation information to scheduling event file 130. Scheduling server program 120 writes the location requirements for the session to location requirement file 90. As previously discussed, an invitee may accept, reject, or counter various aspects of the session, including the assigned location requirements. Scheduling server program 120 may write invitation responses to scheduling event file 130.

At the scheduled date and time of the conference session, an invitee will attempt to join the SIP conference session using the information provided by the received invitation. For example, if the session is a teleconference, the invitee may use client device 50 (in this example, a smartphone), to call the telephone number of a teleconferencing service. Once the invitee has connected to the teleconferencing service, they may enter a participation code to try and access the session. If the session is some other type of media session the invitee may login to the session through the use of a website, URL, program or application. An invitee of this type of session may login to the session using a previously obtained password or username information.

In step 200, location requirement function 80 receives a notification from SIP conferencing server program 70 that an invitee has attempted to join a SIP conference session from client device 50. In one embodiment, the conference session may be a teleconference. SIP conference server program 70 may determine the teleconference the invitee is attempting to join by comparing the participant code (e.g., a unique number for the session, a unique number for the invite to the session, etc.) entered by the invitee when calling in to the teleconference to participant codes included in one or more invitations stored by scheduling server program 120 in scheduling event file 130. In another embodiment, the conference session may be a web based conference, and conference server program 70 may determine the session the invitee is attempting to access by comparing login information to usernames or other information included in one or more invitations stored by scheduling server program 120 in scheduling event file 130.

In response to receiving the notification, location requirement function 80 accesses location requirements for invitees of the conference session (step 210). In one embodiment, location requirement function 80 fetches location requirements for the conference session from location requirement file 90 as stored by scheduling server program 120. In another embodiment, location requirement function 80 may retrieve location requirements assigned to invitees from a database of individuals and allowed locations. For example, a multinational corporation may maintain a database of employees and specific locations assigned to each employee that enable a conference host to organize a confidential or high security teleconference, chat session, or other media session. Other embodiments may assign location requirements to groups of individuals, or a conference organizing host may assign a list of acceptable locations to the entire group of invitees. In the listed embodiments, location requirement function 80 searches the fetched location requirements for location requirements assigned to the invitee. Location requirements may be stored as GPS coordinates, IP addresses, RFID tag information, network connections, telephone numbers, or any other location identifying information. Location requirement information may be mapped and organized according to a room, floor, building, or other identifiable location.

In step 220, location requirement function 80 receives location information from SIP conferencing server program 70. In one embodiment, location requirement function 80 requests location information from SIP conferencing server program 70. In other embodiments, location information is sent along with the notification in step 200. Location requirement function 80 may determine the location information required by comparing the received invitee location information to the information stored by scheduling server program 120 in location requirement file 90.

In one embodiment, the location information received may take the form of the GPS coordinates of a client device such as a smartphone or tablet. In another embodiment, the client device may be a landline and the location information received may come from an external device in the user's possession, such as a GPS receiver, cell phone, tablet, or other external device. In other embodiments location information may include any combination of telephone numbers, RFID tag information, IP addresses, or connections to specific networks. For example, location information may be a connection to a corporation intranet, and more specifically, connection to the corporation intranet from a specific port. The location information received by location requirement function 80 may be any information or data that can indicate the physical location of a client device, client computing device, and/or user. Location information required for a particular SIP conference session may be indicated in the conference session invitation.

In decision 230, location requirement function 80 determines whether the received location information matches the location requirements assigned to the invitee. In one embodiment, location requirement function 80 fetches, from location requirement file 90, stored location requirements assigned to an invitee, according to step 210. Location requirement function 80 compares the location information received from SIP conferencing server program 70 to the location requirements assigned to the invitee. In one embodiment, there may be a threshold to allow for slight changes received location information compared to location requirements assigned to the invitee. For example, there may be a set of assigned GPS coordinates, but an invitee may be able to access the conference from other GPS coordinates, as long as they are within the threshold distance. A benefit of having a threshold is that individual client devices may have different levels of accuracy and precision.

In one example, if the location information received from SIP conferencing server program 70 is the GPS coordinates of client device 50, location requirement function 80 will compare the GPS coordinates of client device 50 to GPS coordinates assigned to the invitee that are stored in location requirement file 90. In another example, if the location information received from SIP conferencing server program 70 is the IP address of client device 60, location requirement function 80 will compare the IP address of client device 60 to the IP address(es) assigned to the invitee as stored in location requirement file 90.

Location information may be mapped to a particular location. For instance, GPS coordinates of an office building may be saved as the particular office building. A user creating a conference session invitation may be able to select the name of the office building as a location requirement option, and the name will correspond to the GPS coordinates of the building. Other embodiments may have location requirements correspond to actual describable locations. Mapping location information to real locations may act to increase conference session participant compliance with assigned location requirements.

If location requirement function 80 determines that the location information received matches the stored location requirements assigned to the invitee, (decision 230, yes branch), location requirement function 80 then determines if the invitee is already connected to the session (decision 240). In one embodiment, location requirement function 80 determines if the invitee is already connected to the session by comparing the telephone number, participant code, or other login information to the information of those currently connected to the session. If the invitee is not already connected to the session, (decision 240, no branch), location requirement function 80 identifies that the invitee is connecting to the session from an approved location and requests that SIP conferencing server program 70 add the invitee to the SIP conference session (step 250). In one embodiment, the invitee may be added to a teleconference session. In another embodiment, the invitee may be added to an IM chat session. In yet another embodiment, the invitee may be allowed to join an interactive multimedia virtual conference session. For example, if the SIP conference session is an IM chat session, SIP conferencing server program 70 may identify the invitee as an invitee to the IM chat session and request that the instant messaging program add the invitee to the IM chat session. In one embodiment, SIP conferencing server program 70 may fetch an instant messaging ID of the invitee. SIP conferencing server program 70 may fetch the instant messaging ID of the invitee and request that the instant messaging program add the instant messaging ID of the invitee to the IM chat session. The type of SIP conference session may vary and may be determined by the creator of the invitation and may be indicated on the invitation.

Once SIP conferencing server program 70 adds the invitee to the conference session (step 250), or after location requirement function 80 determines that the invitee is already connected to the session, (decision 240, yes branch), location requirement function 80 will again receive location information (step 220) and determine whether the location information matches stored location requirements assigned to the invitee. Location requirement function 80 will periodically or continuously receive location information from SIP conferencing server program 70 (step 220), and determine if the received location information matches stored location requirements assigned to the invitee (decision 230). Location requirement function 80 cycles through these steps in order to track the location of the invitee and confirm that the location information received continues to meet the location requirements for the SIP conference session. By cycling through these steps, location requirement function 80 can track the location of the invitee and assure that the invitee is complying with stored location requirements, throughout the SIP conference session.

In one embodiment of the present invention, location requirement function 80 will use location information received in step 220 to track invitees connected to the SIP conference session and alert the invitee and/or host if he/she is moving towards the boundary, is within a specific distance range of the GPS coordinates of the location requirement, or is moving out of the assigned location. Location information may be periodically or continuously received from the client device of the invitee to the SIP conference session.

In an exemplary embodiment of the present invention, location requirement function 80 will receive location information (step 220), and request that SIP conferencing server program 70 use the location information to create a list or map. The list or map may show connected invitees, their location, the duration of their connection, and the connection status of the listed invitees. The list or map may display invitee status on the map by using color-coded markers that represent each invitee and their connection status with regards to the session. For example, connected users may be displayed on the map with a green marker to indicate their current location. Blue markers may indicate past locations of invitees to the session. If an invitee disconnected from the session, and is currently inactive, a gray marker may be used to indicate the last known location of the invitee, prior to his or her disconnection. Timeline information may be displayed on the map or list for an invitee who has made multiple connections throughout the duration of the session. Timeline information may include the duration of each connection, the location information associated with each connection to the session, and other information. A list or map may group invitees together according to their connection location.

If location requirement function 80 determines that the location information received from SIP conferencing program (step 220) does not match location requirements assigned to the invitee (decision 230, no branch), location requirement function 80 may alert the invitee that location requirements have not been met (step 260). This may occur when an invitee attempting to join the session is not at an assigned location, or it may occur to an invitee who had previously joined the session from an allowed location, but has since moved to an area outside the boundaries of that allowed location. In one embodiment, location requirement function 80 may send a request to SIP conferencing server program 70 to alert the invitee via an audio message of the invitee's failure to comply with the location requirement, along with the required locations assigned to that invitee. In another embodiment, location requirement function 80 may send a request to SIP conferencing server program 70 to alert the invitee of the same information via an IM or email. Alerts to the invitee may take the form of a text message, audio message, pop-up window, or any other type of cue that may alert an invitee or host in accordance with client device capabilities.

Location requirement function 80 may also alert the host that the invitee has not met assigned location requirements (step 270). In one embodiment, location requirement function 80 may send a request to SIP conferencing server program 70 to alert the host via an audio message of the invitee's failure to comply with the location requirement, along with the required location(s) assigned to that invitee. In another embodiment, location requirement function 80 may send a request to SIP conferencing server program 70 to alert the host of the same information via an IM or email. Alerts to the host may take the form of a text message, audio message, pop-up window, or any other type of cue that may alert an invitee or host in accordance with client device capabilities.

In step 280, location requirement function 80 requests that SIP conferencing server program 70 disconnect the invitee from the conference or session that they are connected to. By disconnecting the invitee at this point, the SIP conferencing system maintains location dependent security for the session. If the invitee was initially at an improper location, the invitee would never have been connected to the session (see step 230). In such a circumstance, there would be no need to disconnect the invitee from the SIP conference session and step 280 would not be performed.

One embodiment of the present invention may allow a conference host to manually override location requirements. Location requirement function 80 may receive a request to turn off location requirements to one or multiple invitees. If location requirement function 80 receives a request to turn off the location requirements for the invitee, location requirement function 80 will identify the invitee as an invitee connecting to the session and request that SIP conferencing server program 70 add the invitee to the conference session. If the invitee was connected to the conference session, a request to turn off the location requirements for the invitee will result in location requirement function 80 refraining from requesting that SIP conferencing server program 70 disconnect the invitee from the session if the invitee changes his or her location. In this embodiment, if location requirement function 80 does not receive a request to turn off the location requirements for an invitee, location requirement function will proceed to request that SIP conferencing server program 70 remove or disconnect the invitee from the conference session if the invitee does not comply with his or her assigned location requirements.

In another embodiment, location requirement function 80 may request SIP conferencing server program 70 to send a prompt to a conference host before an invitee is disconnected for failure to comply with assigned location requirements. In this embodiment, the prompt may ask the conference host if they would like to override the location requirement and allow the invitee to remain connected to the conference or session. Based on the response received from SIP conferencing server program 70 (e.g., do not override the location requirement), location requirement function 80 may request that SIP conferencing server program 70 disconnect the invitee. Alternatively, the received response (e.g., override the location requirement) may cause location requirement function 80 to refrain from making such a request.

FIG. 3 depicts a block diagram of components of server 30, client computing device 40, and client devices 50 and 60 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 30 and client computing device 40 each include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In one embodiment, memory 306 includes random access memory (RAM) 314 and cache memory 316. In general, memory 306 can include any suitable volatile or non-volatile computer-readable storage media.

SIP conferencing client program 100 and scheduling client program 110 are stored for execution by one or more of the respective computer processors 304 of client computing device 40 via one or more memories of memory 306 of client computing device 40. SIP conferencing server program 70, location requirement function 80, location requirement file 90, scheduling server program 120, and scheduling event file 130 are stored in persistent storage 308 of server 30 for execution and/or access by one or more of the respective computer processors 304 of server 30 via one or more memories of memory 306 of server 30. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including server 30, client computing device 40, client device 50, and client device 60. In these examples, communications unit 310 includes one or more network interface cards. Communications unit 310 may provide communications through the use of either or both physical and wireless communications links. SIP conferencing client program 100 and scheduling client program 110 may be downloaded to persistent storage 308 of client computing device 40 through communications unit 310 of client computing device 40. SIP conferencing server program 70, location requirement function 80, location requirement file 90, scheduling server program 120, and scheduling event file 130 may be downloaded to persistent storage 308 of server 30 through communications unit 310 of server 30.

I/O interface(s) 312 allows for input and output of data with other devices that may be connected to server 30, client computing device 40, client device 50, or client device 60. For example, I/O interface 312 may provide a connection to external devices 318 such as a keyboard, keypad, camera, a touch screen, and/or some other suitable input device. External devices 318 can also include portable computer-readable storage media such as, for example, thumb drives, portable optical or magnetic disks, and memory cards. Software and data used to practice embodiments of the present invention, e.g., SIP conferencing server program 70, location requirement function 80, location requirement file 90, scheduling server program 120, and scheduling event file 130, can be stored on such portable computer-readable storage media and can be loaded onto persistent storage 308 of server 30 via I/O interface(s) 312 of server 30. Software and data used to practice embodiments of the present invention, e.g., SIP conferencing client program 100 and scheduling client program 110, can be stored on such portable computer-readable storage media and can be loaded onto persistent storage 308 of client computing device 40 via I/O interface(s) 312 of client computing device 40. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hard-

What is claimed is:

1. A method for securing a session initiation protocol (SIP) conference session, the method comprising:
   a computer assigning a location requirement to an invitee of a SIP conference session;
   a computer receiving a first location information of the invitee attempting to connect to the SIP conference session;
   the computer determining that the received first location information at least partially matches the location requirement assigned to the invitee attempting to connect to the SIP conference session; and
   responsive to the computer determining that the received first location information at least partially matches the location requirement assigned to the invitee attempting to connect to the SIP conference session, the computer causing the invitee to be connected to the SIP conference session.

2. The method of claim 1, wherein the first location information and the location requirement comprise global positioning system (GPS) coordinates.

3. The method of claim 1, wherein the first location information assigned to the invitee attempting to connect to the session is stored in a database.

4. The method of claim 1, further comprising:
   the computer receiving a second location information from the invitee connected to the SIP conference session; and
   the computer sending an alert when the second location information does not at least partially match the location requirement.

5. The method of claim 4, further comprising:
   the computer disconnecting the invitee from the SIP conference session when the location information does not at least partially match the location requirement.

6. The method of claim 2, further comprising:
   the computer receiving a third location information from the invitee connected to the SIP conference session, wherein the third location information comprises GPS coordinates; and
   the computer sending an alert when the third location information matches GPS coordinates located within a specific distance range of the GPS coordinates of the location requirement.

7. The method of claim 1 further comprising:
   the computer generating a map identifying the first location information of the invitee connected to the SIP conference session; and
   the computer causing the map to be displayed.

8. A computer program product for securing a session initiation protocol (SIP) conference session, the computer program product comprising:
   one or more computer-readable storage devices and program instructions stored on the one or more computer-readable storage devices, wherein the one or more computer-readable storage devices are not transitory signals per se, the program instructions comprising:
   program instructions to assign a location requirement to an invitee of a SIP conference session;
   program instructions to receive a first location information of the invitee attempting to connect to the SIP conference session;
   program instructions to determine that the received first location information at least partially matches the location requirement assigned to the invitee attempting to connect to the SIP conference session; and
   program instructions to, responsive to determining that the received first location information at least partially matches the location requirement assigned to the invitee attempting to connect to the SIP conference session, cause the invitee to be connected to the SIP conference session.

9. The computer program product of claim 8, wherein the first location information and the location requirement comprise global positioning system (GPS) coordinates.

10. The computer program product of claim 8, wherein the first location information assigned to the invitee attempting to connect to the session is stored in a database.

11. The computer program product of claim 8, further comprising:
    program instructions, stored on the one or more computer-readable storage devices, to receive a second location information from the invitee connected to the SIP conference session; and
    program instructions, stored on the one or more computer-readable storage devices, to send an alert when the second location information does not at least partially match the location requirement.

12. The computer program product of claim 11, further comprising:
    program instructions, stored on the one or more computer-readable storage devices, to disconnect the invitee from the SIP conference session when the location information does not at least partially match the location requirement.

13. The computer program product of claim 9, further comprising:
    program instructions, stored on the one or more computer-readable storage devices, to receive a third location information from the invitee connected to the SIP conference session, wherein the third location information comprises GPS coordinates; and
    program instructions, stored on the one or more computer-readable storage devices, to send an alert when the third location information matches GPS coordinates located within a specific distance of the GPS coordinates of the location requirement.

14. The computer program product of claim 8 further comprising:
    program instructions, stored on the one or more computer-readable storage devices, to generate a map identifying the first location information of the invitee connected to the SIP conference session; and
    program instructions, stored on the one or more computer-readable storage devices, to cause the map to be displayed.

15. A computer system for securing a session initiation protocol (SIP) conference session, the computer system comprising:
    one or more computer processors, one or more computer-readable memory devices, one or more computer-readable storage devices, and program instructions stored on the computer-readable storage devices for execution by at least one of the one or more processors via the one or more memory devices, the program instructions comprising:
    program instructions to assign a location requirement to an invitee of a SIP conference session;
    program instructions to receive a first location information of the SIP conference session invitee attempting to connect to the SIP conference session;

program instructions to determine that the received first location information at least partially matches the location requirement assigned to the invitee attempting to connect to the SIP conference session; and program instructions to cause the invitee to be connected to the SIP conference session.

16. The computer system of claim 15, wherein the first location information and the location requirement comprise global positioning system (GPS) coordinates.

17. The computer system of claim 15, further comprising:
program instructions, stored on the computer-readable storage devices for execution by at least one of the one or more processors via the one or more memory devices, to receive a second location information from the invitee connected to the SIP conference session; and
program instructions, stored on the computer-readable storage devices for execution by at least one of the one or more processors via the one or more memory devices, to send an alert when the second location information does not at least partially match the location requirement.

18. The computer system of claim 17, further comprising:
program instructions, stored on the computer-readable storage devices for execution by at least one of the one or more processors via the one or more memory devices, to disconnect the invitee from the SIP conference session when the location information does not at least partially match the location requirement.

19. The computer system of claim 16, further comprising:
program instructions, stored on the computer-readable storage devices for execution by at least one of the one or more processors via the one or more memory devices, to receive a third location information from the invitee connected to the SIP conference session, wherein the third location information comprises GPS coordinates; and
program instructions, stored on the computer-readable storage devices for execution by at least one of the one or more processors via the one or more memory devices, to send an alert when the third location information matches GPS coordinates located within a specific distance of the GPS coordinates of the location requirement.

20. The computer system of claim 15 further comprising:
program instructions, stored on the computer-readable storage devices for execution by at least one of the one or more processors via the one or more memory devices, to generate a map identifying the first location information of the invitee connected to the SIP conference session; and
program instructions, stored on the computer-readable storage devices for execution by at least one of the one or more processors via the one or more memory devices, to cause the map to be displayed.

* * * * *